United States Patent [19]

Nicolas

[11] 4,394,231

[45] Jul. 19, 1983

[54] CATHODE FOR THE ELECTROLYTIC PRODUCTION OF HYDROGEN

[75] Inventor: Edgard Nicolas, Meise-Eversem, Belgium

[73] Assignee: Solvay & Cie, Brussels, Belgium

[21] Appl. No.: 297,311

[22] Filed: Aug. 28, 1981

Related U.S. Application Data

[63] Continuation of Ser. No. 163,086, Jun. 26, 1980.

[30] Foreign Application Priority Data

Jun. 29, 1979 [FR] France ................................ 79 17441

[51] Int. Cl.$^3$ .......................... C25B 1/02; C25B 11/06
[52] U.S. Cl. ....................................... 204/129; 204/98; 204/290 R; 204/290 F; 204/291
[58] Field of Search ............... 204/290 R, 290 F, 291, 204/129, 98; 252/425.3

[56] References Cited

U.S. PATENT DOCUMENTS

| 3,399,966 | 9/1968 | Suzuki et al. | 428/469 |
| 3,977,958 | 8/1976 | Caldwell et al. | 204/252 |
| 4,190,516 | 2/1980 | Kajimaya et al. | 204/290 R |
| 4,265,728 | 5/1981 | Suchanski et al. | 204/290 F |

Primary Examiner—F. Edmundson
Attorney, Agent, or Firm—Robert E. Burns; Emmanuel J. Lobato; Bruce L. Adams

[57] ABSTRACT

The invention relates to a cathode for the electrolytic production of hydrogen.

The cathode comprises an active surface consisting of a metal oxide obtained by the thermal decomposition of a thermally decomposable compound of a metal chosen from amongst cobalt, iron, manganese or nickel.

The cathode is particularly suitable for the electrolysis of aqueous sodium chloride solutions in cells with a permeable diaphragm.

10 Claims, No Drawings

CATHODE FOR THE ELECTROLYTIC PRODUCTION OF HYDROGEN

This is a continuation of application Ser. No. 163,086, filed June 26, 1980.

The present invention relates to a cathode for the electrolytic production of hydrogen.

In electrolysis processes, it is generally sought to reduce the potentials of the electrochemical reactions at the electrodes to as low a value as possible. This is particularly the case in electrolysis processes in which gaseous hydrogen is produced at the cathode, such as processes for the electrolysis of water, aqueous solutions of hydrochloric acid and aqueous solutions of sodium chloride or potassium chloride.

The cathodes which have most commonly been used hitherto for the electrolysis of water or aqueous solutions of sodium chloride or potassium chloride have generally consisted of plates or gauzes of mild steel. In fact, these known cathodes exhibit the advantage that they are easy to use and have a low cost.

However, the hydrogen evolution overvoltage on these known steel cathodes is relatively high, and this increases the cost of the electrolysis processes in an unfavourable manner.

To overcome this disadvantage of the known steel cathodes, German Patent application No. 2,620,589, filed on May 10, 1976 in the name of Hodogaya Chemical Co. Ltd., proposes cathodes which consist of a support made of a metal chosen from amongst titanium, tantalum, zirconium, niobium and their alloys, and of an active coating chosen from amongst the oxides of ruthenium, rhodium, palladium, osmium, iridium and platinum. The active coating, the purpose of which is to reduce the hydrogen evolution overvoltage, can be obtained by applying, to the cathode support, a solution of a ruthenium, rhodium, palladium, osmium or iridium salt, and subsequently heating the solution in order to convert the salt into an oxide. As a variant, the active coating on this known cathode can itself be coated with a layer of an oxide of a metal chosen from amongst those from groups II and VI of the periodic table of the elements, the essential purpose of which oxide is to inhibit the reduction of hypochlorite ions when the cathode is used for the electrolysis of alkali metal chloride solutions.

U.S. Pat. No. 4,100,049, published on July 11, 1978 and granted to Diamond Shamrock Corp., proposes cathodes for electrolysis cells, which comprise a metal support and, on the latter, an active coating formed of a mixture of palladium oxide and zirconium oxide. As a variant, in order to reduce the cost of the cathode, it is suggested to replace 50% of the weight of palladium oxide by cobalt oxide or nickel oxide.

Although they improve the hydrogen evolution overvoltage to a certain extent, these known cathodes exhibit the disadvantage of being expensive, due to the necessary presence of a noble metal in their constitution.

Geman Patent application No. 2,811,472, filed on Mar. 16, 1978 in the name of Tokuyama Soda K.K., furthermore proposes cathodes for the electrolytic production of hydrogen, which comprise, on a support made of iron, nickel or an alloy of these metals, an active coating which consists of a metal from group VIII of the periodic table of the elements, and which is obtained by electrolytic deposition or by the thermal decomposition, in an inert or reducing atmosphere, of a thermally decomposable compound of the said metal.

These known cathodes exhibit the disadvantage of being difficult and expensive to manufacture, particularly in the case where the active coating is obtained by a thermal method. In fact, the thermal decomposition of the thermally decomposable compound requires excessively high temperatures, which are generally above 800° C., in order to release the active metal in the metallic state. This results in a large energy expenditure and in the risk of deformation of the cathode under the effect of thermal stresses.

The object of the invention is to overcome the above-mentioned disadvantages of the known cathodes by providing, for this purpose, a cathode which does not contain a noble metal, which is easy to manufacture at a moderate cost, and which nevertheless has a low hydrogen evolution overvoltage.

The invention thus relates to a cathode for the electrolytic production of hydrogen, which comprises an active zone containing a metal oxide obtained by the thermal decomposition of a thermally decomposable compound; according to the invention, the active zone essentially consists of a metal oxide obtained by the thermal decomposition of a thermally decomposable compound of a metal chosen from amongst cobalt, iron, manganese and nickel.

By definition, the expression metal oxide of the active zone of the cathode is understood as denoting either a simple metal oxide of cobalt, iron, manganese or nickel, a mixture of oxides of these metals, a solid solution of oxides of these metals or a defined oxide compound. Examples as defined compounds which fall within the scope of the invention are the compounds, having the spinel structure, of the general formula $M^{II}M_2^{III}O_4$, in which $M^{II}$ denotes iron and/or cobalt and/or manganese and/or nickel, with a valency of two, and in which $M^{III}$ denotes one or more of these metals with a valency of three (Structural Inorganic Chemistry, A. F. Wells, Oxford University Press, 1962, pages 487 to 490, and Crystal Structures of Minerals, Bragg and Claringbull, Bell and Sons Ltd., 1965, pages 102 to 106). Magnetite, of the general formula $Fe_3O_4(Fe^{II}Fe_2^{III}O_4)$, leads to particularly valuable results.

According to a preferred embodiment of the invention, the metal oxide of the active zone of the cathode consists of haematite, which is the oxide of trivalent iron, of the general formula $Fe_2O_3$. This embodiment of the invention is particularly suitable when the cathode is used in the presence of aqueous alkali metal hydroxide solutions, such as the caustic soda solutions and the caustic brines obtained by the electrolysis of sodium chloride brines, respectively in electrolysis cells with a membrane of selective permeability and in electrolysis cells with a permeable diaphragm.

The expression membrane with selective permeability is understood as meaning a thin non-porous separator which separates the anodes from the cathodes and comprises an ion exchange material. Examples of membranes of selective permeability which are suitable for cells for the electrolysis of brine include cationic membranes which contain $SO_3^-$ groups and result from the copolymerisation of tetrafluoroethylene and sulphonated perfluorovinyl ether, such as the membranes known under the name NAFION and sold by E. I. du Pont de Nemours and Co.

The term diaphragm is understood as meaning a partition which is permeable to the electrolyte, is made of an inert material and separates the anodes from the cathodes. Examples of known diaphragms include asbestos diaphragms, such as those described in U.S. Pat. No. 1,855,497 of May 7, 1928, in the name of Stuart, and in Belgian Pat. No. 773,918 of Oct. 14, 1971, in the name of SOLVAY & Cie, porous sheets formed of a mixture of asbestos and a polyelectrolyte, such as those described and claimed in Luxembourg Pat. No. 74,835 of Apr. 26, 1976, in the name of SOLVAY & Cie. and porous sheets made of polytetrafluoroethylene, such as those described in Belgian Pat. Nos. 794,889 of Feb. 2, 1973, and 817,675, 817,676 and 817,677 of July 15, 1974, in the name of Imperial Chemical Industries Limited.

In the cathode according to the invention, the thermally decomposable compounds can be any of compounds which, on heating in a controlled atmosphere, release an oxide of iron, cobalt, manganese or nickel, or a mixture thereof, a solid solution or a defined compound of at least two of these oxides. For example, they can be nitrates, sulphates, phosphates or salts of carboxylic acids, such as formates, acetates, propionates, oxalates or the like.

The thermally decomposable compounds can be used in the solid state, for example in the form of powders, or in the liquid state, for example in the form of molten salts, suspensions or solutions.

By definition, the heat treatment consists in heating the thermally decomposable compound to a sufficiently high temperature and in a controlled atmosphere, in order to cause the decomposition of this compound and the crystallisation of the metal oxide of the active zone of the cathode.

The temperature of the heat treatment depends on various parameters including the nature of the desired metal oxide, the nature of the thermally decomposable compound, its state (solid or liquid) and the nature and the pressure of the working atmosphere. Temperatures between 50° and 700° C., preferably temperatures below 400° C., are generally suitable. Temperatures between 100° and 300° C. have proved particularly appropriate.

Although it is possible, under certain particular conditions (in particular when the thermally decomposable compound chosen is a nitrate or an oxalate), to carry out the thermal decomposition in an inert atmosphere (for example in a nitrogen or argon atmosphere), it is generally preferred, according to the invention, to carry out the thermal decomposition in an oxidising atmosphere, for example in the presence of air.

As a variant, the active zone of the cathode according to the invention can contain traces of foreign substances in addition to the metal oxide of cobalt, iron, manganese and/or nickel, as defined above, provided that these foreign substances do not affect the properties of the metal oxide in respect of the hydrogen evolution overvoltage.

In the cathode according to the invention, the metal oxide of the active zone can form the whole of the cathode.

According to a preferred embodiment of the invention, the cathode is a composite cathode and comprises a support made of an electrically conducting material, under the active zone.

In this particular embodiment of the invention, the support is generally chosen from amongst materials which are resistant to the electrochemical environment for which the cathode is intended.

In the particular case where the cathode is intended for cells for the electrolysis to aqueous alkali metal chloride solutions, it is advantageous to choose a support made of cobalt, chromium, iron, nickel, manganese or an alloy of these metals. Iron or steel supports are particularly suitable.

The thickness of the metal oxide of the active zone on the support must be sufficient to withstand the wear caused by abrasion in contact with the gaseous hydrogen and with the electrolytes which circulate in contact therewith during electrolysis. In general terms, it is desirable for the thickness of the metal oxide of the active zone on the support to be at least 0.5 micron, preferably at least 5 microns. Excellent results are generally obtained with thicknesses equal to at least 10 microns, in particular with thicknesses of between 50 and 250 microns.

To manufacture a cathode according to this preferred embodiment of the invention, it suffices to apply the thermally decomposable compound to the support and then to heat it in a controlled atmosphere in order to decompose it and to crystallise the metal oxide in situ on the support. For this purpose, it is desirable to apply the thermally decomposable compound in the liquid state, preferably in the form of a solution, to the support. Any appropriate coating technique can be used for this purpose, such as immersing the support in a bath of the thermally decomposable compound, painting the support with the said liquid compound or spraying the latter onto the support.

According to a preferred embodiment of the invention, the metal oxide is obtained by the thermal decomposition of the thermally decomposable compound, the latter being in solution or in suspension in a bath containing a soluble alkali metal salt.

In fact, all other things being equal, it has been observed that the presence of a soluble alkali metal salt in the bath containing the thermally decomposable compound improves the performances of the cathode according to the invention, in particular by further reducing its hydrogen evolution overvoltage and by lengthening its effective working life.

In this preferred embodiment of the invention, the choice of the soluble alkali metal salt depends on the nature of the bath. In general, in the case of aqueous baths, good results are obtained with alkali metal halides or nitrates, although sodium chloride is preferred.

The minimum amount of soluble alkali metal salt to be used depends on the nature of the salt, the nature of the bath and the nature of the thermally decomposable compound. It can be determined in each particular case by means of a routine laboratory experiment. In practice, in the case where sodium chloride is used in an aqueous bath, good results are obtained with contents equal to at least 0.2 mol per liter of the bath, contents of more than 0.5 mol per liter being preferred.

The maximum admissable amount of soluble alkali metal salt is equal to the amount required to saturate the bath.

The profile of the cathode according to the invention is not critical. For example, it can consist of a plane, curved or corrugated plate, which is perforated if appropriate, or of a rectilinear or coiled wire, or also of a perforated gauze.

A particularly valuable application of the cathode according to the invention is in cells, with a permeable diaphragm and with a membrane of selective permeability, for the electrolysis of sodium chloride brines, such as the cells described, by way of example, in French Pat. Nos. 2,164,623 of Dec. 12, 1972, 2,223,083 of Mar. 28, 1973, 2,230,411 of Mar. 27, 1974 and 2,248,335 of Oct. 14, 1974, and in French Patent application No. 77/11,370 of Apr. 12, 1977, all in the name of SOLVAY & Cie.

A further valuable application of the cathode according to the invention is in cells for the electrolysis of water and in cells for the production of alkali metal hydrochlorite or chlorate, such as the cells described in French Pat. Nos. 2,023,877 of Nov. 19, 1969 and 2,147,063 of July 17, 1972, both in the name of SOLVAY & Cie.

The value of the invention will become apparent from the description of the following application examples, which are given exclusively by way of illustration.

In each of the examples which now follow, an aqueous brine containing 255 g of sodium chloride per kg was electrolysed in a laboratory cell with vertical electrodes separated by an asbestos diaphragm.

The cell, of cylindrical shape, comprised an anode formed of a circular plate made of titanium, which was pierced with vertical slots and coated with an active material in the form of mixed crystals consisting of 50% by weight of ruthenium dioxide and 50% by weight of titanium dioxide.

The cathode consisted of a circular metal structure in the form of a gauze, the shape of which was identical in each example, but the constitution of which varied from one example to the other.

The overall surface area of each electrode of the cell was equal to 113 cm$^2$ and the distance between the anode and the cathode was fixed at 5 mm.

The diaphragm was applied to that face of the cathode oriented towards the anode, starting from a suspension of asbestos in a caustic brine, and was then heated for 16 hours at 90° C., by applying the technique described in Luxembourg Patent application No. 77,996 of Aug. 19, 1977, in the name of SOLVAY & Cie. The weight of the resulting diaphragm was 1.3 kg/m$^2$ of cathode.

In each example, the abovementioned brine was electrolysed in the cell, at 85° C., with a current density of 2 kA per square meter of anode, and the flow rate of brine introduced into the anode chamber was adjusted so that the caustic brine leaving the cathode chamber contained about 100 g of sodium hydroxide and 140 g of sodium chloride per kg. The cathode potential was measured periodically using the Luggin capillary method of measurement, the capillary being connected to a saturated calomel reference electrode (SCE) (Modern Electrochemistry, Bockris and Reddy, Plenum Press, 1970, Volume 2, pages 890 and 891).

EXAMPLE 1

The cathode consisted of a mild steel gauze carrying an active coating of haematite according to the invention. To manufacture the cathode, the gauze was first cleaned using hydrochloric acid rendered passive with formaldehyde. An aqueous solution containing, per liter, 200 g of ammonium ferritrioxalate, of the general formula $(NH_4)_3Fe(C_2O_4)_3.3H_2O$, was then sprayed onto its surface and the cathode was then heated for 15 minutes in an oven at 225° C., in the presence of air, in order to decompose the ammonium ferritrioxalate and to crystallize a first layer of haematite on the gauze.

The treatment involving spraying with the ammonium ferritrioxalate solution and heating in an oxidising atmosphere was repeated ten times so as to form a total of ten superposed layers of haematite crystals on the gauze. After the tenth layer of haematite had been formed, the cathode was kept at 225° C. for one hour, in the presence of air, and was then left to cool to about 20° C. in contact with the atmosphere.

The cathode thus obtained, which conforms to the invention, was subjected to the electrolysis experiment described above.

The results of the experiment are recorded in Table I below.

TABLE I

| Electrolysis time (days) | Cathode potential (V) |
|---|---|
| 10 | −1.27 |
| 60 | −1.28 |
| 90 | −1.32 |

EXAMPLE 2

The experiment of Example 1 was repeated using, in order to form the active zone, an aqueous bath containing 214 g of ammonium ferritrioxalate and 29 g of sodium chloride per liter.

After cleaning in the manner explained in Example 1, the gauze was preheated to 250° C. and then coated immediately with a first layer of the bath by immersing it in the latter. The gauze was then heated for 15 minutes in an oven at 250° C., in the presence of air, in order to decompose the ammonium ferritrioxalate and to crystallise a first layer of haematite on the gauze.

The treatment involving immersion in the bath and heating at 250° C. in an oxidising atmosphere was repeated ten times so as to apply ten superposed layers of haematite to the gauze. After the tenth layer had been formed, the cathode was kept at 250° C. for two hours, in the presence of air, and was then left to cool to about 20° C. in contact with the atmosphere.

The results of the electrolysis experiment with the cathode obtained in this way are mentioned in Table II.

TABLE II

| Electrolysis time (days) | Cathode potential (V) |
|---|---|
| 10 | −1.27 |
| 60 | −1.27 |
| 90 | −1.27 |
| 115 | −1.27 |

EXAMPLE 3

A cathode was prepared by applying the process described in Example 2, but, this time, a bath containing 200 g of ammonium ferritrioxalate and 100 g of sodium chloride per liter was used.

After an electrolysis time of two months under the conditions described above, the cathode potential was equal to −1.26 V, relative to the saturated calomel electrode.

EXAMPLE 4

The experiment of Example 1 was repeated once more using, for the coating bath, a solution of 120 g of ferric nitrate per liter of butan-1-ol.

The mild steel gauze, cleaned beforehand as described in Example 1, was subsequently heated to 250°

C. and then immersed in the coating bath in order to form the layer of solution thereon.

The heat treatment was identical to that of Example 2, except that the heating time for each layer, in the oven at 250° C., was ten minutes. Furthermore, after the tenth layer of iron oxide had been formed on the cathode, the latter was heated for 16 hours at 350° C. and then cooled to about 20° C. in contact with the atmosphere.

After an electrolysis time of one month under the experimental conditions described above, the cathode had a potential equal to $-1.28$ V, relative to the saturated calomel electrode.

EXAMPLE 5

In this experiment, an active zone formed of cobalt oxide was applied to the mild steel gauze.

To do this, after cleaning in the manner described in Example 1, the mild steel gauze was immersed in an aqueous bath containing 291 g of cobalt nitrate hexahydrate, of the general formula $Co(NO_3)_2.6H_2O$, and 255 g of sodium nitrate per liter.

The gauze impregnated with a first layer of the bath was then heated for 15 minutes in an oven at 250° C., in the presence of air, so as to decompose the cobalt nitrate and to form a layer of cobalt oxide.

The treatment involving immersion and heating at 250° C. was repeated five times so as to apply five superposed layers of cobalt oxide to the gauze. After the fifth layer had been formed, the cathode was kept at 250° C. for one hour and then cooled in contact with the atmosphere.

After an electrolysis time of 30 days under the conditions described above, the cathode potential was equal to $-1.31$ V, relative to the saturated calomel electrode.

EXAMPLE 6

By way of comparison, a cathode of the prior art was used; this cathode consisted of a mild steel gauze which was identical to that of Examples 1 to 3 and was only cleaned by treatment with hydrochloric acid rendered passive with formaldehyde, and was then mounted as such in the experimental electrolysis cell.

As from the start of electrolysis, the cathode potential was $-1.41$ V, relative to the saturated calomel electrode; after 70 days of experiments, the cathode potential was equal to $-1.45$ V, relative to the saturated calomel electrode.

Comparison of the electrolysis results of Examples 1 to 3 (according to the invention) with those of Example 4 (prior art) immediately shows the advance made by the invention as regards the magnitude of the cathode potential and, consequently, the energy efficiency of the electrolysis cells.

I claim:

1. In a process for the production of hydrogen in an electrolytic cell, wherein hydrogen is electrolytically produced on the active zone of a cathode, the improvement consisting in that the cathode active zone essentially consists of a metal oxide produced by the thermal decomposition of a thermally decomposable compound of a metal selected from the group consisting of cobalt, iron, maganese and nickel, said metal oxide being produced in situ on a support made of an electrically conducting material selected from the group consisting of cobalt, chromium, iron, maganese, nickel and alloys of these metals.

2. A process according to claim 1, in which the metal oxide is obtained by the thermal decomposition of a thermally decomposable compound chosen from the group consisting of nitrates, sulphates, phosphates and salts of carboxylic acids.

3. A process according to claim 1, in which the metal oxide is obtained by the thermal decomposition of said thermally decomposable compound in an oxidizing medium.

4. A process according to claim 3, in which the metal oxide is obtained by the thermal decomposition of said thermally decomposable compound at a temperature between 100° and 300° C.

5. A process according to any one of claims 1 to 4, in which the metal oxide is haematite.

6. A process according to any one of claims 1 to 4, in which the metal oxide is obtained by the thermal decomposition of the thermally decomposable compound, the latter being in solution in a bath containing a soluble alkali metal salt.

7. A process according to claim 6, in which the soluble alkali metal salt is an alkali metal halide.

8. A process according to claim 7, in which the soluble alkali metal salt is sodium chloride.

9. A process according to claim 8, in which the bath contains at least 0.5 mol of soluble alkali metal salt per liter.

10. In a process for the production of hydrogen, wherein hydrogen is electrolytically produced on the active zone of a cathode, the improvement in that the cathode active zone consists essentially of iron oxide produced by applied to a cathode support comprising a mild steel gauze, a thermally decomposable compound of iron, heating said support with said compound thereon in an oxidizing atmosphere to convert said compound into an oxide and repeating said applying and heating steps to form on said support an oxide coating having a thickness of at least 10 microns.

* * * * *